(12) United States Patent  (10) Patent No.: US 7,796,164 B2
Kimura  (45) Date of Patent: Sep. 14, 2010

(54) SIGNAL READING APPARATUS AND TEST APPARATUS

(75) Inventor: Hiroki Kimura, Tokyo (JP)

(73) Assignee: Advantest Corporation, Tokyo (JP)

( * ) Notice: Subject to any disclaimer, the term of this patent is extended or adjusted under 35 U.S.C. 154(b) by 558 days.

(21) Appl. No.: 11/637,955

(22) Filed: Dec. 12, 2006

(65) Prior Publication Data

US 2007/0146524 A1  Jun. 28, 2007

Related U.S. Application Data

(63) Continuation of application No. PCT/JP2005/011053, filed on Jun. 16, 2005.

(30) Foreign Application Priority Data

Jun. 17, 2004 (JP) ............................. 2004-180151

(51) Int. Cl.
*H04N 9/73* (2006.01)
(52) U.S. Cl. .................................. 348/228.1
(58) Field of Classification Search .................. 348/294, 348/222.1, 228.1, 312; 345/55
See application file for complete search history.

(56) References Cited

U.S. PATENT DOCUMENTS 5,138,459 A * 8/1992 Roberts et al. ............ 348/231.6
5,264,939 A 11/1993 Chang
5,572,155 A * 11/1996 Tamayama .................... 327/94
5,949,483 A * 9/1999 Fossum et al. .............. 348/303
2001/0008420 A1 7/2001 Opris
2003/0043089 A1* 3/2003 Hanson et al. ................. 345/55
2003/0193699 A1 10/2003 Tay

FOREIGN PATENT DOCUMENTS

JP  3-225284  10/1991
JP  4-61587  2/1992

(Continued)

OTHER PUBLICATIONS

Japanese Office Action for patent application No. 2004-180151, mailed Jan. 12, 2010, and English translation thereof, 9 pages.

(Continued)

*Primary Examiner*—David L Ometz
*Assistant Examiner*—Akshay Trehan
(74) *Attorney, Agent, or Firm*—Osha Liang LLP

(57) ABSTRACT

There is provided a signal reading apparatus that reads an output signal from a solid-state image sensing device. The apparatus includes a plurality of measuring means that respectively measures pixel data included in the output signal from the solid-state image sensing device and a timing generator that generates a clock signal showing a timing at which each of the plurality of measuring means measures the pixel data from the solid-state image sensing device and respectively supplies the clock signal to the plurality of measuring means in order to make the plurality of measuring means sequentially measure the pixel data from the solid-state image sensing device by means of an interleaving operation.

10 Claims, 15 Drawing Sheets

FOREIGN PATENT DOCUMENTS

| | | |
|---|---|---|
| JP | 2000-224392 | 8/2000 |
| JP | 2001-258053 | 9/2001 |
| JP | 2002-542679 | 12/2002 |
| WO | 00/62530 | 10/2000 |
| WO | 03/017648 | 2/2003 |
| JP | 4-284582 | 10/1992 |
| JP | 5-167932 | 7/1993 |
| JP | 8-186764 | 7/1996 |
| JP | 9-27883 | 1/1997 |

OTHER PUBLICATIONS

Patent Abstracts of Japan for patent application with Publication No. 08-186764, Publication Date: Jul. 16, 1996, 1 page.

International Search Report issued in International Application No. PCT/JP2005/011053 mailed on Oct. 4, 2005 and English translation thereof, 4 pages.

* cited by examiner

SIGNAL READING APPARATUS AND TEST APPARATUS

CROSS REFERENCE TO RELATED APPLICATION

This is a continuation application of PCT/JP2005/011053 filed on Jun. 16, 2005, which claims priority from a Japanese Patent application No. 2004-180151 filed on Jun. 17, 2004, the contents of which are incorporated herein by reference.

BACKGROUND

1. Field of the Invention

The present invention relates to a signal reading apparatus and a test apparatus. More particularly, the present invention relates to a signal reading apparatus that reads an output signal from a solid-state image sensing device and a test apparatus that tests the solid-state image sensing device.

2. Related Art

A CCD (Charge Coupled Device) transfers electric charges photoelectrically converted by a photo diode based on a clock signal input from a driver (hereinafter, referred to as a DR) to output the charges as an electrical signal. A signal reading apparatus respectively measures a reset division and a data division in the electrical signal output from the CCD, and reads a difference between the reset division and the data division as pixel data for the CCD. Then, a variable gain amplifier (hereinafter, referred to as a VGA) amplifies a signal level of pixel data, and an analog-digital converter (hereinafter, referred to as an ADC) converts the pixel data into a digital signal.

In recent years, there has been developed a CCD for extremely operating at high speed in order to take moving images with high picture quality. Therefore, since the signal reading apparatus must be speeded up, there has become a problem that extremely high-speed VGA and ADC are required.

SUMMARY

Therefore, it is an object of the present invention to provide a signal reading apparatus and a test apparatus that can solve the foregoing problems. The above and other objects can be achieved by combinations described in the independent claims. The dependent claims define further advantageous and exemplary combinations of the present invention.

According to the first aspect of the present invention, there is provided a signal reading apparatus that reads an output signal from a solid-state image sensing device. The signal reading apparatus includes: a plurality of measuring means that respectively measures pixel data included in the output signal from the solid-state image sensing device; and a timing generator that generates a clock signal showing a timing at which each of the plurality of measuring means measures the pixel data from the solid-state image sensing device and respectively supplies the clock signal to the plurality of measuring means in order to make the plurality of measuring means sequentially measure the pixel data from the solid-state image sensing device by means of an interleaving operation.

The signal reading apparatus may further include a signal processing circuit that sequentially selects and acquires the pixel data from the solid-state image sensing device measured by the plurality of measuring means by means of a selector, and the timing generator may generate a clock signal showing a timing corresponding to the timing at which each of the plurality of measuring means measures the pixel data from the solid-state image sensing device and supply the clock signal to the selector.

The timing generator may make the solid-state image sensing device output the same output signal by multiple times and generate a clock signal to be respectively supplied to the plurality of measuring means in order to make the measuring means different from each other measure the pixel data at the same timing within the output signal from the solid-state image sensing device when the solid-state image sensing device firstly outputs the output signal and when the solid-state image sensing device secondly outputs the output signal, and the signal processing circuit may acquire data obtained by averaging the pixel data measured by the plurality of measuring means when the solid-state image sensing device has firstly output the output signal and the pixel data measured by the plurality of measuring means when the solid-state image sensing device has secondly output the output signal.

According to the second aspect of the present invention, there is provided a test apparatus that tests a solid-state image sensing device. The test apparatus includes: a plurality of measuring means that respectively measures pixel data included in an output signal from the solid-state image sensing device; a timing generator that generates a clock signal showing a timing at which each of the plurality of measuring means measures the pixel data from the solid-state image sensing device and respectively supplies the clock signal to the plurality of measuring means in order to make the plurality of measuring means sequentially measure the pixel data from the solid-state image sensing device by means of an interleaving operation; and a quality deciding section that decides the good or bad of the solid-state image sensing device based on the pixel data measured by the plurality of measuring means.

According to the third aspect of the present invention, there is provided a signal reading apparatus that reads an output signal from a solid-state image sensing device. The signal reading apparatus includes: a measuring means that measures pixel data included in the output signal from the solid-state image sensing device; and a timing generator that makes the solid-state image sensing device output the same output signal by multiple times and generates a clock signal showing a timing at which the measuring means measures the pixel data from the solid-state image sensing device to supply the clock signal to the measuring means, in order to make the measuring means measure different pixel data in the output signal from the solid-state image sensing device when the solid-state image sensing device firstly outputs the output signal and when the solid-state image sensing device secondly outputs the output signal.

According to the fourth aspect of the present invention, there is provided a test apparatus that tests a solid-state image sensing device. The test apparatus includes: a measuring means that measures pixel data included in an output signal from the solid-state image sensing device; a timing generator that makes the solid-state image sensing device output the same output signal by multiple times and generates a clock signal showing a timing at which the measuring means measures the pixel data from the solid-state image sensing device to supply the clock signal to the measuring means, in order to make the measuring means measure different pixel data in the output signal from the solid-state image sensing device when the solid-state image sensing device firstly outputs the output signal and when the solid-state image sensing device secondly outputs the output signal; and a quality deciding section that decides the good or bad of the solid-state image sensing device based on the pixel data acquired by the measuring means.

According to the fifth aspect of the present invention, there is provided a signal reading apparatus that reads an output signal from a solid-state image sensing device. The signal reading apparatus includes: a plurality of measuring means that respectively measures pixel data included in the output signal from the solid-state image sensing device; and a signal processing circuit that acquires data obtained by averaging the pixel data measured by the plurality of measuring means.

According to the sixth aspect of the present invention, there is provided a test apparatus that tests a solid-state image sensing device. The test apparatus includes: a plurality of measuring means that respectively measures pixel data included in an output signal from the solid-state image sensing device; a signal processing circuit that acquires data obtained by averaging the pixel data measured by the plurality of measuring means; and a quality deciding section that decides the good or bad of the solid-state image sensing device based on the averaged pixel data acquired by the signal processing circuit.

The summary of the invention does not necessarily describe all necessary features of the present invention. The present invention may also be a sub-combination of the features described above.

DESCRIPTION OF EXEMPLARY EMBODIMENTS

The embodiments of the invention will now be described based on the preferred embodiments, which do not intend to limit the scope of the present invention, but just exemplify the invention. All of the features and the combinations thereof described in the embodiment are not necessarily essential to the invention.

Figure 1:
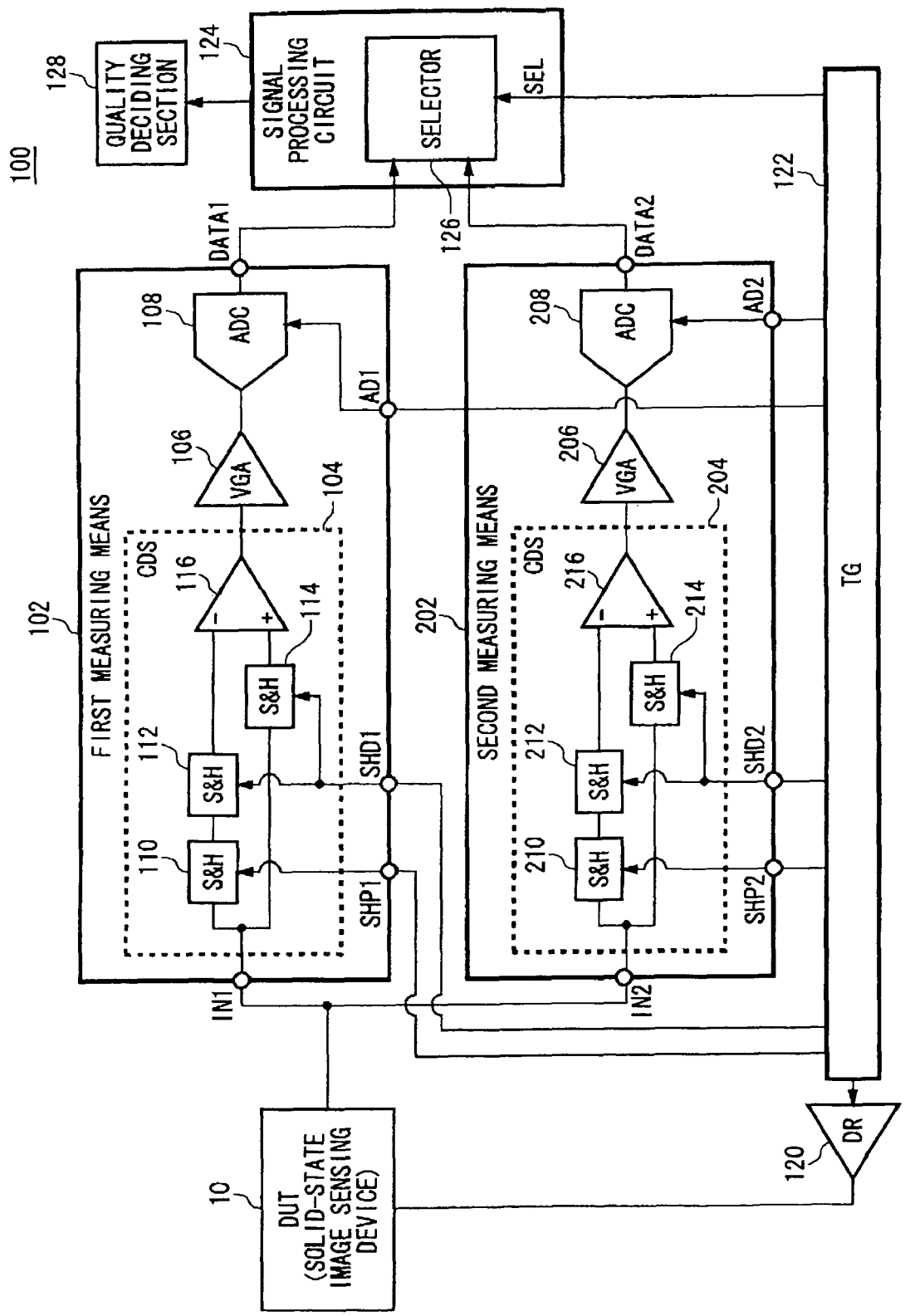
FIG. 1 is a view exemplary showing a configuration of a test apparatus.

FIG. 1 is a view exemplary showing a configuration of a test apparatus 100 according to the first embodiment of the present invention. The test apparatus 100 includes a first measuring means 102, a second measuring means 202, a DR 120, a timing generator (hereinafter, referred to as a TG) 122, a signal processing circuit 124, and a quality deciding section 128. In addition, the test apparatus 100 is an example of a signal reading apparatus that reads an output signal from a solid-state image sensing device (hereinafter, referred to as a DUT) of the present invention. The DUT is, for example, a CCD, and outputs electric charges photoelectrically converted by a photo diode as an electrical signal.

The first measuring means 102 has a correlated double sampling circuit (hereinafter, referred to as a CDS) 104, a VGA 106, and an ADC 108. The CDS 104 includes a sample and hold (hereinafter, referred to as an S&H) 110, an S&H 112, an S&H 114, and a subtracter 116. Moreover, the second measuring means 202 has a CDS 204, a VGA 206, and an ADC 208. The CDS 204 includes an S&H 210, an S&H 212, an S&H 214, and a subtracter 216. Moreover, the signal processing circuit 124 has a selector 126.

In addition, the first measuring means 102 and the second measuring means 202 are an example of a measuring means of the present invention, and the measuring means of the present invention may have a circuit configuration other than the first measuring means 102 and the second measuring means 202. Moreover, the first measuring means 102 and the second measuring means 202 may have an amplifier with fixed gain in place of the VGA 106 or 206.

The TG 122 generates a clock signal showing a timing at which the DUT 10 outputs an output signal to supply the clock signal to the DUT 10 via the DR 120. Then, the DUT 10 outputs the output signal including continued pixel data to supply the output signal to the first measuring means 102 and the second measuring means 202 based on the clock signal input from the DR 120.

Moreover, the TG 122 generates a clock signal showing a timing at which each of the first measuring means 102 and the second measuring means 202 measures pixel data included in the output signal from the DUT 10, and supplies the clock signal to the first measuring means 102 and the second measuring means 202. Then, the first measuring means 102 and the second measuring means 202 respectively measure pixel data included in the output signal from the DUT 10 based on the clock signal supplied from the TG 122.

Specifically, the S&H 110 samples a voltage value of a reset division in the output signal from the DUT 10 based on a clock signal (SHP1) input from the TG 122. The S&H 112 acquires the voltage value sampled by the S&H 110 to supply the acquired value to the subtracter 116 based on a clock signal (SHD1) input from the TG 122. Moreover, the S&H 114 samples a voltage value of a data division in the output signal from the DUT 10 based on the clock signal (SHD1) input from the TG 122 to supply the value to the subtracter 116. That is to say, the clock signal (SHP1) and the clock signal (SHD1) have a phase difference for a time interval between the reset division and the data division in the output signal from the DUT 10. Moreover, the S&H 112 and the S&H 114 synchronously supply the voltage values to the subtracter 116 by operating based on the same clock signal (SHD1).

The subtracter 116 computes a difference between the voltage value of the reset division supplied from the S&H 112 and the voltage value input from the S&H 114 to output the difference as pixel data. The VGA 106 amplifies pixel data output from the subtracter 116. The ADC 108 converts the pixel data amplified by the VGA 106 into a digital signal to supply the digital signal to the signal processing circuit 124, based on a clock signal (AD1) input from the TG 122.

The S&H 210 samples a voltage value of the reset division in the output signal from the DUT 10 based on a clock signal (SHP2) input from the TG 122. The S&H 212 acquires the voltage value sampled by the S&H 210 to supply the acquired value to the subtracter 216 based on a clock signal (SHD2) input from the TG 122. Moreover, the S&H 214 samples a voltage value of the data division in the output signal from the DUT 10 to supply the sampled value to the subtracter 216, based on the clock signal (SHD2) input from the TG 122. That is to say, the clock signal (SHP2) and the clock signal (SHD2) have a phase difference for a time interval between the reset division and the data division in the output signal from the DUT 10. Moreover, the S&H 212 and the S&H 214 synchronously supply the voltage values to the subtracter 216 by operating based on the same clock signal (SHD2).

The subtracter 216 computes a difference between the voltage value of the reset division supplied from the S&H 212 and the voltage value input from the S&H 214 to output the difference as pixel data. The VGA 206 amplifies pixel data output from the subtracter 116. The ADC 208 converts the pixel data amplified by the VGA 206 into a digital signal to supply the digital signal to the signal processing circuit 124, based on a clock signal (AD2) input from the TG 122.

Moreover, the TG 122 generates a clock signal (SEL) showing a timing corresponding to a timing at which each of the first measuring means 102 and the second measuring means 202 measures pixel data included in the output signal from the DUT 10, and supplies the clock signal to the selector 126. Then, the signal processing circuit 124 sequentially selects and acquires the pixel data included in the output signal from the DUT 10, which are measured by the first measuring means 102 and the second measuring means 202, by means of the selector 126 based on the clock signal (SEL) input from the TG 122.

The quality deciding section 128 decides the good or bad of the DUT 10 based on the pixel data that are measured by the first measuring means 102 and the second measuring means 202 and on which the signal processing circuit 124 performs a desired signal processing. By the above operations, the test apparatus 100 tests the DUT 10 based on pixel data included in an output signal from the DUT 10.

In addition, although the test apparatus 100 includes two measuring means of the first measuring means 102 and the second measuring means 202 in the present example, in another example, the test apparatus 100 may include three or more measuring means and measure pixel data included in an output signal corn the DUT 10 by an interleaving operation by means of three or more measuring means.

Figure 2:
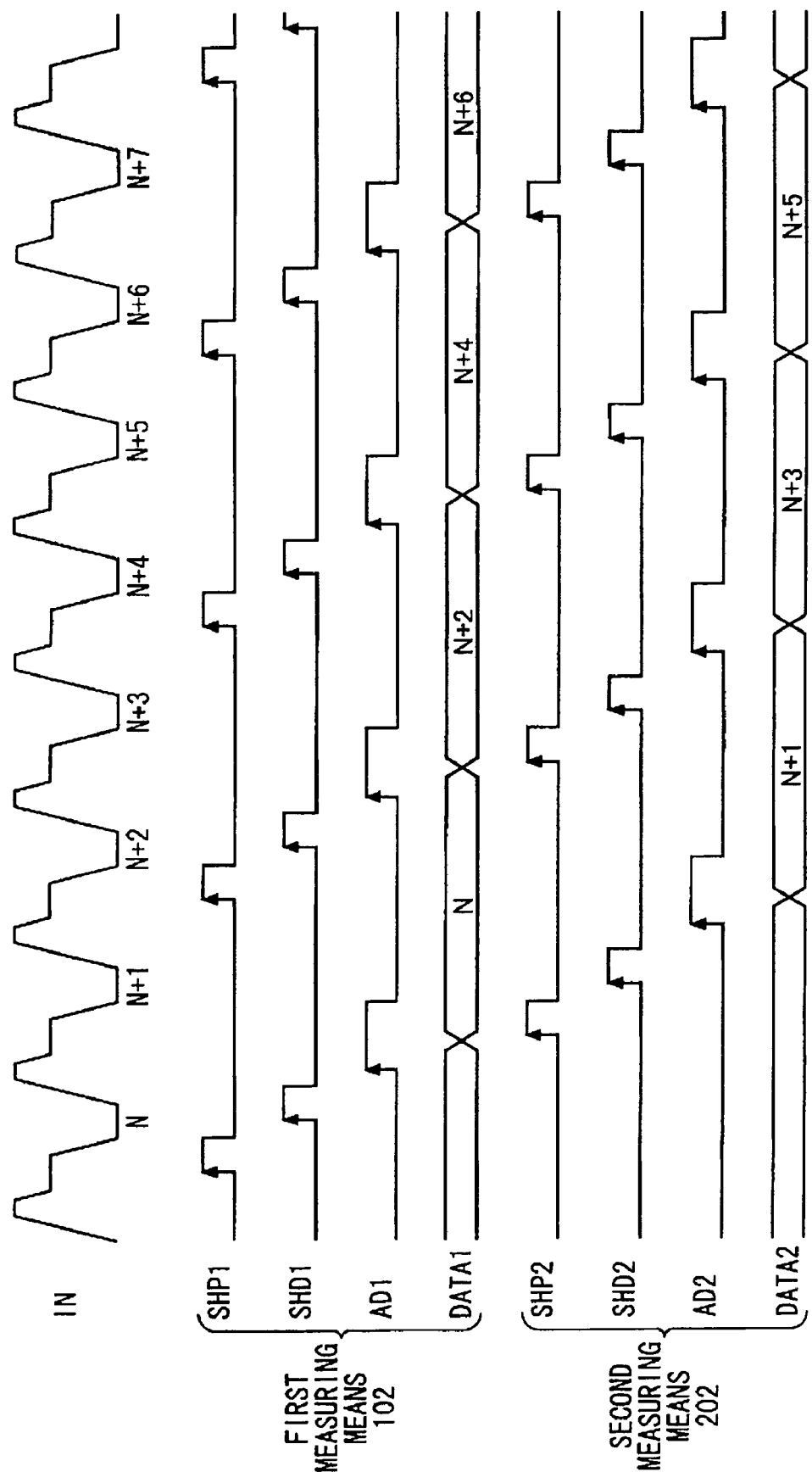
FIG. 2 is a view showing an operation of a first measuring means and a second measuring means.
Figure 3:
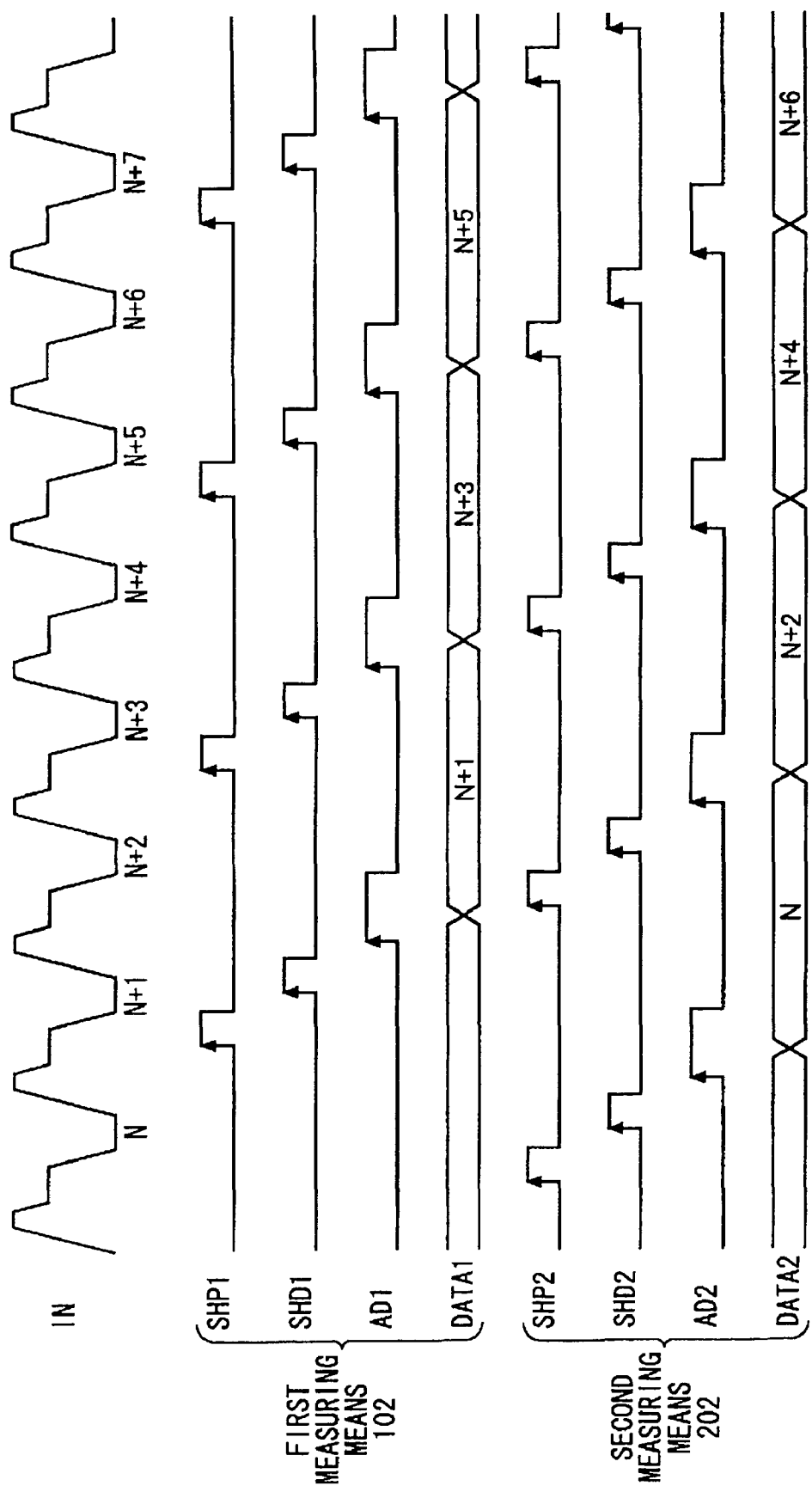
FIG. 3 is a view showing an operation of a first measuring means and a second measuring means.
Figure 4:
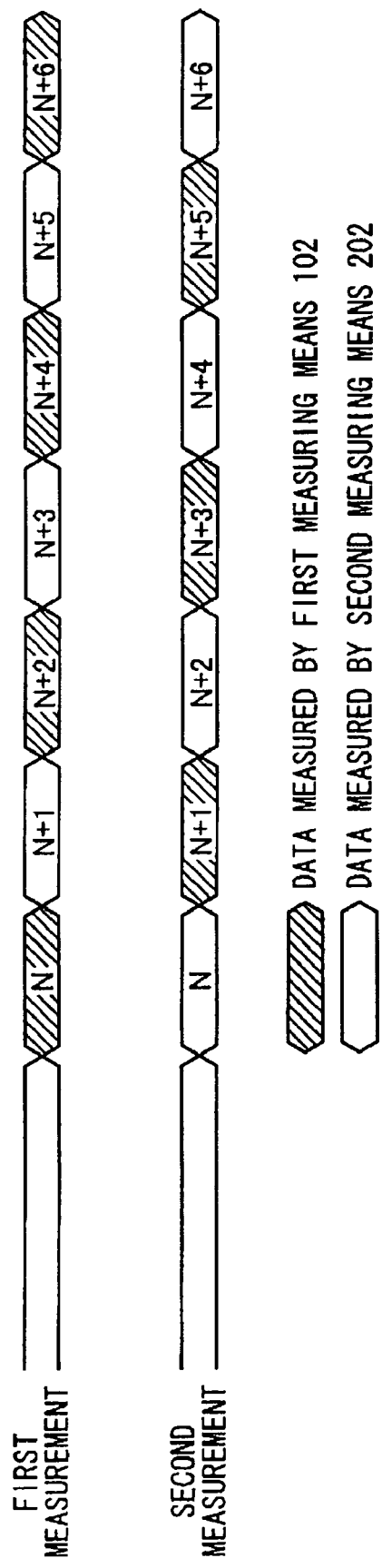
FIG. 4 is a view showing pixel data acquired by a signal processing circuit.
Figure 5:
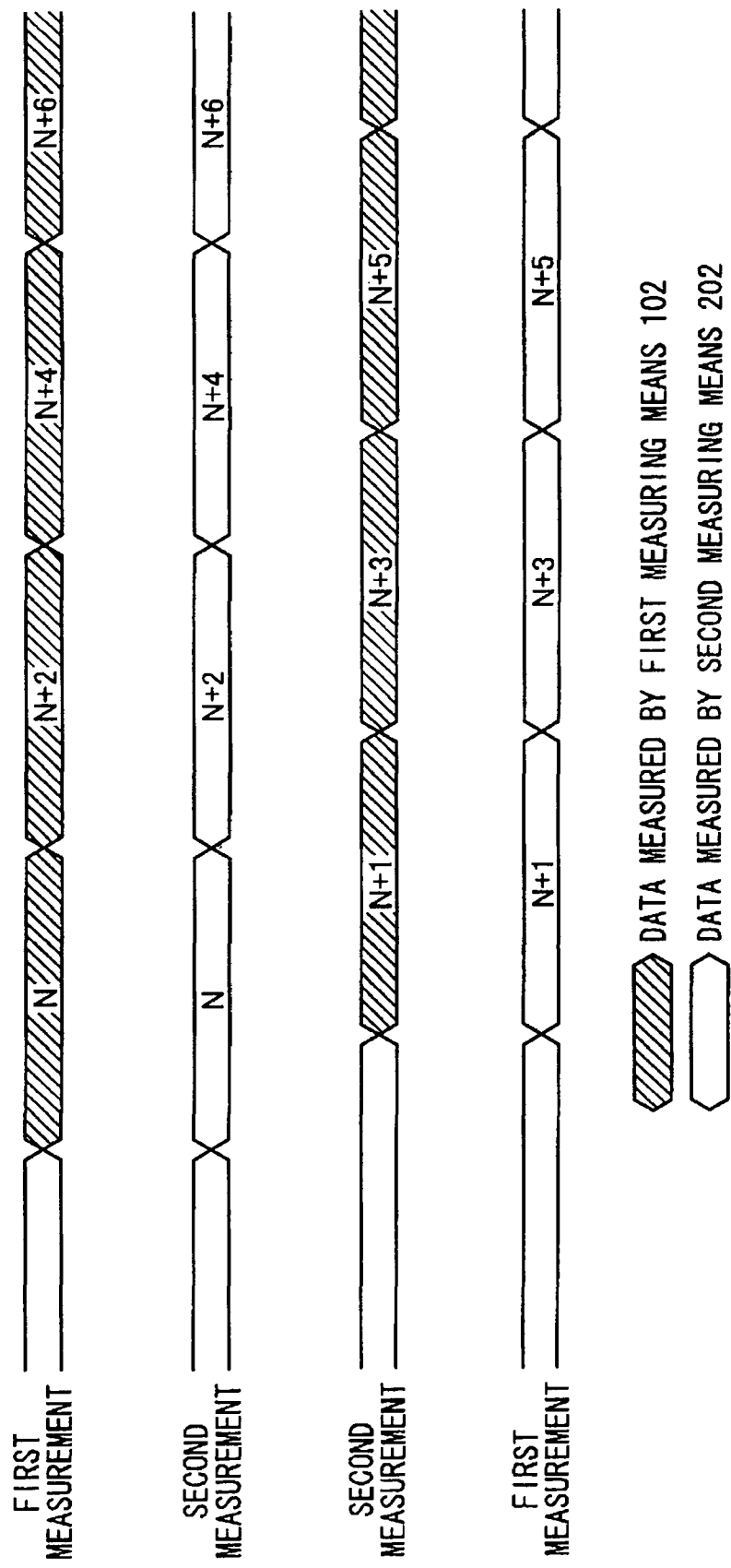
FIG. 5 is a view showing pixel data acquired by a signal processing circuit.

FIGS. 2 to 5 are views showing the first example of an operation of the test apparatus 100 according to the first embodiment. FIG. 2 shows operations of the first measuring means 102 and the second measuring means 202 when the DUT 10 firstly outputs an output signal, and FIG. 3 shows operations of the first measuring means 102 and the second measuring means 202 when the DUT 10 secondly outputs an output signal. Moreover, FIGS. 4 and 5 show pixel data acquired by the signal processing circuit 124.

The TG 122 generates a clock signal showing a timing at which each of the first measuring means 102 and the second measuring means 202 measures pixel data included in the output signal from the DUT 10 and respectively supplies the clock signal to the first measuring means 102 and the second measuring means 202, in order to make the first measuring means 102 and the second measuring means 202 sequentially measure the pixel data included in the output signal from the DUT 10 by means of an interleaving operation. Moreover, the TG 122 makes the DUT 10 output the same output signal by multiple times by supplying a clock signal showing a timing at which the DUT 10 outputs the output signal by multiple times via the DR 120. Then, the TG 122 generates the clock signal showing the timing at which each of the first measuring means 102 and the second measuring means 202 measures the pixel data included in the output signal from the DUT 10, in order to make the measuring means different from each other measure the pixel data at the same timing within the output signal from the DUT 10 when the DUT 10 firstly outputs the output signal and when the DUT 10 secondly outputs the output signal.

First, with reference to FIG. 2, it will be explained about an operation of the test apparatus 100 when the DUT 10 firstly outputs an output signal (IN). The TG 122 sets a phase difference between the clock signals (SHP1, SHD1, AD1) and the clock signals (SHP2, SHD2, AD2) to a length of pixel data included in the output signal (IN) from the DUT 10, and supplies the clock signals (SHP1, SHD1, AD1) and the clock signals (SHP2, SHD2, AD2) to each of the first measuring means 102 and the second measuring means 202. In this way, the first measuring means 102 and the second measuring means 202 measure the pixel data included in the output signal (IN) every pixel data in order. That is to say, the first measuring means 102 measures a pixel data (N) and the second measuring means 202 measures a pixel data (N+1), and the first measuring means 102 measures a pixel data (N+2) and the second measuring means 202 measures a pixel data (N+3).

Next, with reference to FIG. 3, it will be described about an operation of the test apparatus 100 when the DUT 10 secondly outputs the output signal (IN). The TG 122 supplies the clock signals (SHP1, SHD1, AD1) to the first measuring means 102 when the DUT 10 secondly outputs the output signal (IN), at the same timing as a timing at which the clock signals (SHP2, SHD2, AD2) have been supplied to the second measuring means 202 when the DUT 10 firstly outputs the output signal (IN). Moreover, the TG 122 supplies the clock signals (SHP2, SHD2, AD2) to the second measuring means 202 when the DUT 10 secondly outputs the output signal (IN), at the same timing as a timing at which the clock signals (SHP1, SHD1, AD1) have been supplied to the first measuring means 102 when the DUT 10 firstly outputs the output signal (IN).

In this way, the first measuring means 102 and the second measuring means 202 sequentially measure pixel data different from when the DUT 10 firstly outputs the output signal (IN). That is to say, the second measuring means 202 measures the pixel data (N), the first measuring means 102 measures the pixel data (N+1), the second measuring means 202 measures the pixel data (N+2), and the first measuring means 102 measures the pixel data (N+3).

Next, with reference to FIG. 4, it will be described about an operation of the signal processing circuit 124. The TG 122 supplies the clock signal (SEL) corresponding to the timing, at which the first measuring means 102 and the second measuring means 202 respectively measure pixel data, to the selector 126. Then, the signal processing circuit 124 selects and acquires the pixel data, which are respectively measured by the first measuring means 102 and the second measuring means 202, by means of the selector 126 based on the clock signal (SEL).

That is to say, the signal processing circuit 124 acquires the pixel data (N) from the first measuring means 102, acquires the pixel data (N+1) from the second measuring means 202, acquires the pixel data (N+2) from the first measuring means 102, and acquires the pixel data (N+3) from the second measuring means 202, when the DUT 10 firstly outputs the output signal. Moreover, the signal processing circuit 124 acquires the pixel data (N) from the second measuring means 202, acquires the pixel data (N+1) from the first measuring means 102, acquires the pixel data (N+2) from the second measuring means 202, and acquires the pixel data (N+3) from the first measuring means 102, when the DUT 10 secondly outputs the output signal.

Then, the signal processing circuit 124 acquires data obtained by averaging the pixel data measured by the first measuring means 102 and the second measuring means 202 when the DUT 10 firstly has output the output signal and the pixel data measured by the first measuring means 102 and the second measuring means 202 when the DUT 10 secondly has output the output signal, and stores the acquired data on a memory.

Next, with reference to FIG. 5, it will be described about an alternative example of an operation of the signal processing circuit 124. In the descriptions of FIG. 4, although the signal processing circuit 124 has sequentially selected and acquired the pixel data measured by the first measuring means 102 or the second measuring means 202 by means of the selector 126, the signal processing circuit 124 according to the alternative example may not have the selector 126. That is to say, the signal processing circuit 124 stores, on the memory, the pixel data measured by the first measuring means 102 and the pixel data measured by the second measuring means 202 when the DUT 10 firstly outputs the output signal, and stores, on the memory, the pixel data measured by the first measuring means 102 and the pixel data measured by the second measuring means 202 when the DUT 10 secondly output the output signal. Then, the signal processing circuit 124 averages the pixel data firstly measured by the first measuring means 102 and the pixel data secondly measured by the second measuring means 202, and averages the pixel data firstly measured by the second measuring means 202 and the pixel data secondly measured by the first measuring means 102.

According to the test apparatus 100 of the present example, it is possible to test the DUT 10 operating at high speed by providing a plurality of measuring means and measuring pixel data included in an output signal from the DUT 10 by an interleaving operation. Moreover, although there is a measurement error due to a mismatch between the first measuring means 102 and the second measuring means 202, it is possible to prevent the generation of striped pattern by the mismatch between the first measuring means 102 and the second measuring means 202 when replaying an image based on pixel data.

Specifically, assuming that a level of the pixel data included in the output signal from the DUT 10 is x, a measured value by the first measuring means 102 is $y_1=ax+b$, and a measured value by the second measuring means 202 is $y_2=cx+d$, the pixel data averaged and acquired by the signal processing circuit 124 becomes $Y=(a+c)x/2+(b+d)/2$. That is to say, since $(a+c)/2$ and $(b+d)/2$ are constants determined by characteristics of the first measuring means 102 and the second measuring means 202, the pixel data acquired by the signal processing circuit 124 are seen similarly to the pixel data measured by one measuring means. Therefore, it is possible to prevent the generation of measurement error by a mismatch between the first measuring means 102 and the second measuring means 202.

Moreover, according to the test apparatus 100 of the present example, since the pixel data measured by the first measuring means 102 and the pixel data measured by the second measuring means 202 are averaged, it is possible to reduce random noises generated by the DUT 10 or the test apparatus 100.

Figure 6:
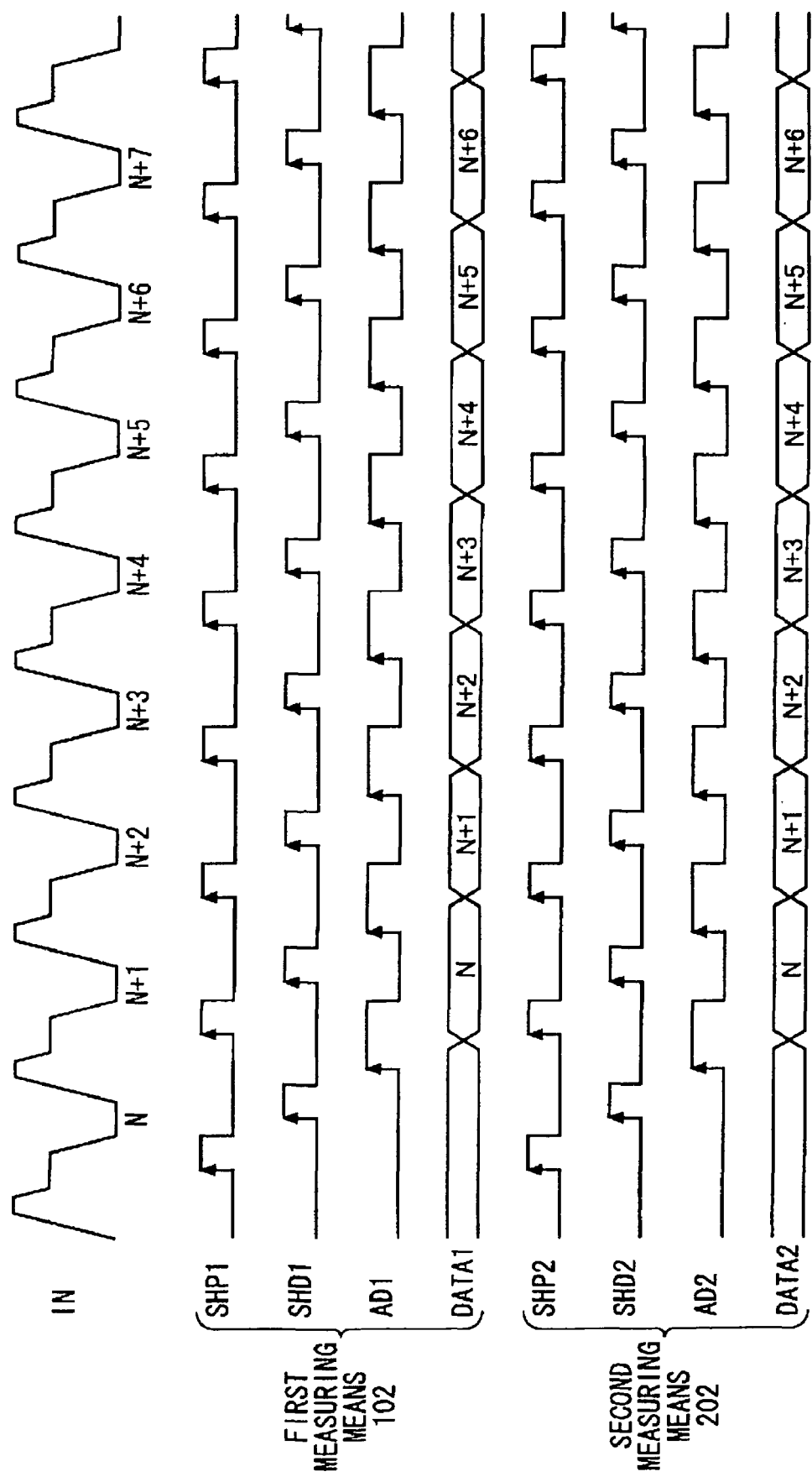
FIG. 6 is a view showing an operation of a first measuring means and a second measuring means.
Figure 7:
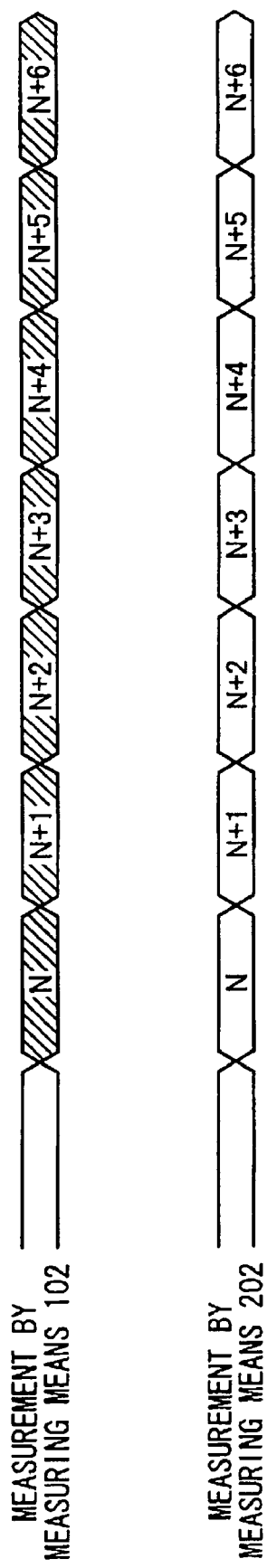
FIG. 7 is a view showing pixel data acquired by a signal processing circuit.

FIGS. 6 and 7 show the second example of an operation of the test apparatus 100 according to the first embodiment. FIG. 6 shows operations of the first measuring means 102 and the second measuring means 202. FIG. 7 shows pixel data acquired by the signal processing circuit 124.

The TG 122 generates the clock signal showing the timing at which each of the first measuring means 102 and the second measuring means 202 measures the pixel data included in the output signal from the DUT 10 and respectively supplies the clock signal to the first measuring means 102 and the second measuring means 202, in order to make the first measuring means 102 and the second measuring means 202 simultaneously measure the pixel data included in the output signal from the DUT 10.

First, with reference to FIG. 6, it will be described about an operation of the test apparatus 100. The TG 122 supplies the clock signals (SHP1, SHD1, AD1) to the first measuring means 102 and supplies the clock signals (SHP2, SHD2, AD2) having the same timing as that of the clock signals (SHP1, SHD1, AD1) to the second measuring means 202. In this way, the first measuring means 102 and the second measuring means 202 simultaneously measure the pixel data (N, N+1, N+2, N+3 . . . ) included in the output signal (IN).

Next, with reference to FIG. 7, it will be described about an operation of the signal processing circuit 124. The signal processing circuit 124 acquires the pixel data respectively measured by the first measuring means 102 and the second measuring means 202 at the same time. Then, the signal processing circuit 124 acquires by averaging the pixel data measured by the first measuring means 102 and the pixel data measured by the second measuring means 202, and stores the acquired data on the memory.

According to the test apparatus 100 of the present example, since the pixel data measured by the first measuring means 102 and the pixel data measured by the second measuring means 202 are averaged, it is possible to reduce random noises generated by the DUT 10 or the test apparatus 100 without increasing the number of times of measurements.

Figure 8:
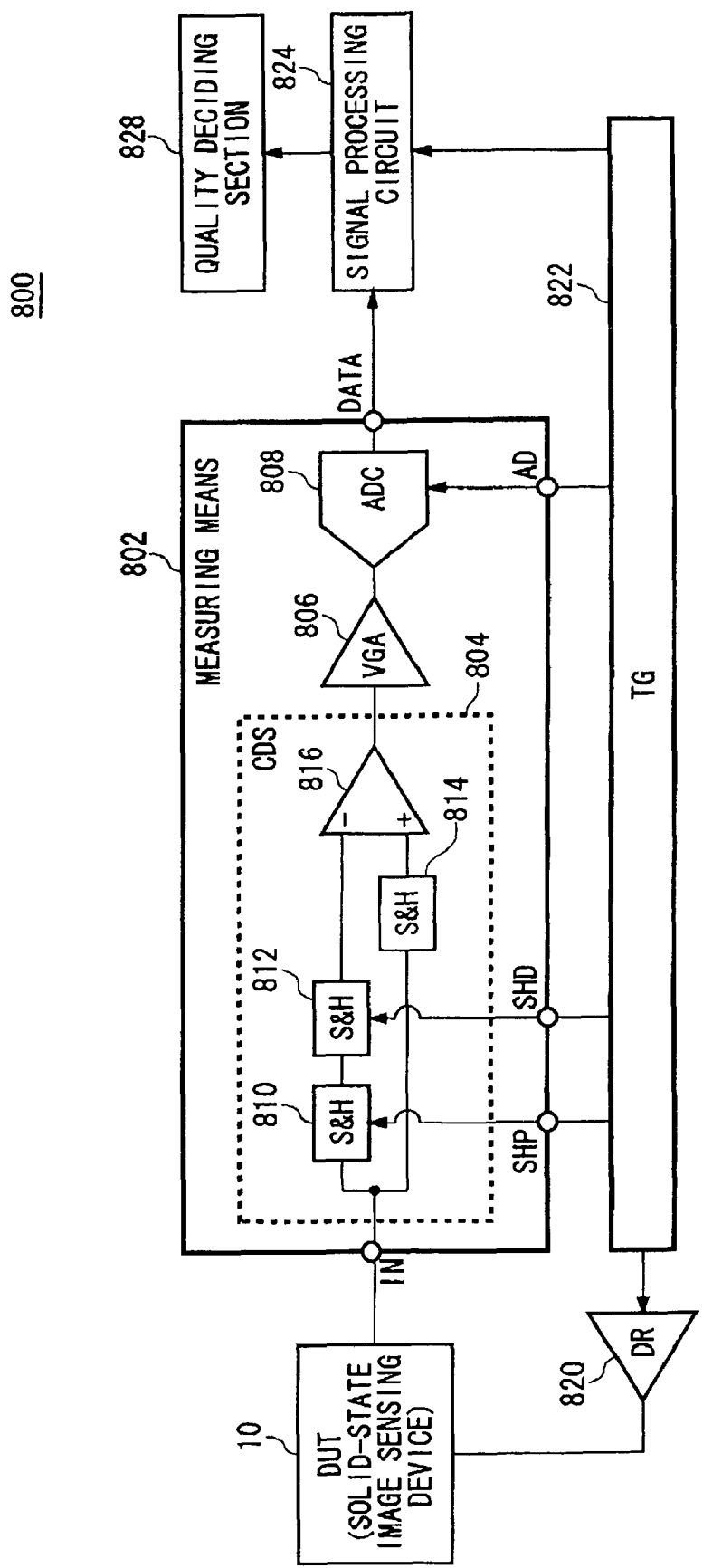
FIG. 8 is a view exemplary showing a configuration of a test apparatus.

FIG. 8 is a view exemplary showing a configuration of a test apparatus 800 according to the second embodiment of the present invention. The test apparatus 100 includes a measuring means 802, a DR 820, a TG 822, a signal processing circuit 824, and a quality deciding section 828. In addition, the test apparatus 800 is an example of a signal reading apparatus that reads an output signal from a solid-state image sensing device of the present invention. The measuring means 802 has a CDS 804, a VGA 806, and an ADC 808. The CDS 804 includes an S&H 810, an S&H 812, an S&H 814, and a subtracter 816.

In addition, the measuring means 802 is an example of a measuring means of the present invention, and the measuring means of the present invention may have a circuit configuration other than the measuring means 802. Moreover, the measuring means 802 may have an amplifier with fixed gain in place of the VGA 806.

The TG 822 generates a clock signal showing a timing at which the DUT 10 outputs an output signal via the DR 820 to supply the clock signal to the DUT 10. Then, the DUT 10 outputs an output signal including continued pixel data to supply the output signal to the measuring means 802 based on the clock signal input from the DR 820.

Moreover, the TG 822 generates a clock signal showing a timing at which the measuring means 802 measures the pixel data included in the output signal from the DUT 10, and supplies the clock signal to the measuring means 802. Then, the measuring means 802 measures the pixel data included in the output signal from the DUT 10 based on the clock signal supplied from the TG 822.

Specifically, the S&H 810 samples a voltage value of a reset division in the output signal from the DUT 10 based on a clock signal (SHP) input from the TG 822. The S&H 812 acquires the voltage value sampled by the S&H 810 to supply the voltage value to the subtracter 816 based on a clock signal (SHD) input from the TG 822. Moreover, the S&H 814 samples a voltage value of a data division in the output signal from the DUT 10 to supply the voltage value to the subtracter 816 based on the clock signal (SHD) input from the TG 822. That is to say, the clock signals (SHP) and (SHD) have a phase difference for a time interval between the reset division and the data division in the output signal from the DUT 10. Moreover, the S&H 812 and the S&H 814 synchronously supply the voltage values to the subtracter 816 by operating based on the same clock signal (SHD).

The subtracter 816 computes a difference between the voltage value of the reset division supplied from the S&H 812 and the voltage value input from the S&H 814 to output the difference as pixel data. The VGA 806 amplifies the pixel data output from the subtracter 816. The ADC 808 converts the pixel data amplified by the VGA 806 into a digital signal to supply the digital signal to the signal processing circuit 824, based on a clock signal (AD) input from the TG 822.

Moreover, the TG 822 generates a clock signal showing a timing corresponding to a timing at which the measuring means 802 measures the pixel data included in the output signal from the DUT 10, and supplies the clock signal to the signal processing circuit 824. Then, the signal processing circuit 824 acquires the pixel data included in the output signal from the DUT 10, which are measured by the measuring means 802, based on the clock signal supplied from the TG 822.

The quality deciding section 828 decides the good or bad of the DUT 10 based on the pixel data that are measured by the measuring means 802 and on which the signal processing circuit 824 performs a desired signal processing. By the above operations, the test apparatus 800 tests the DUT 10 based on the pixel data included in the output signal from the DUT 10.

Figure 9:
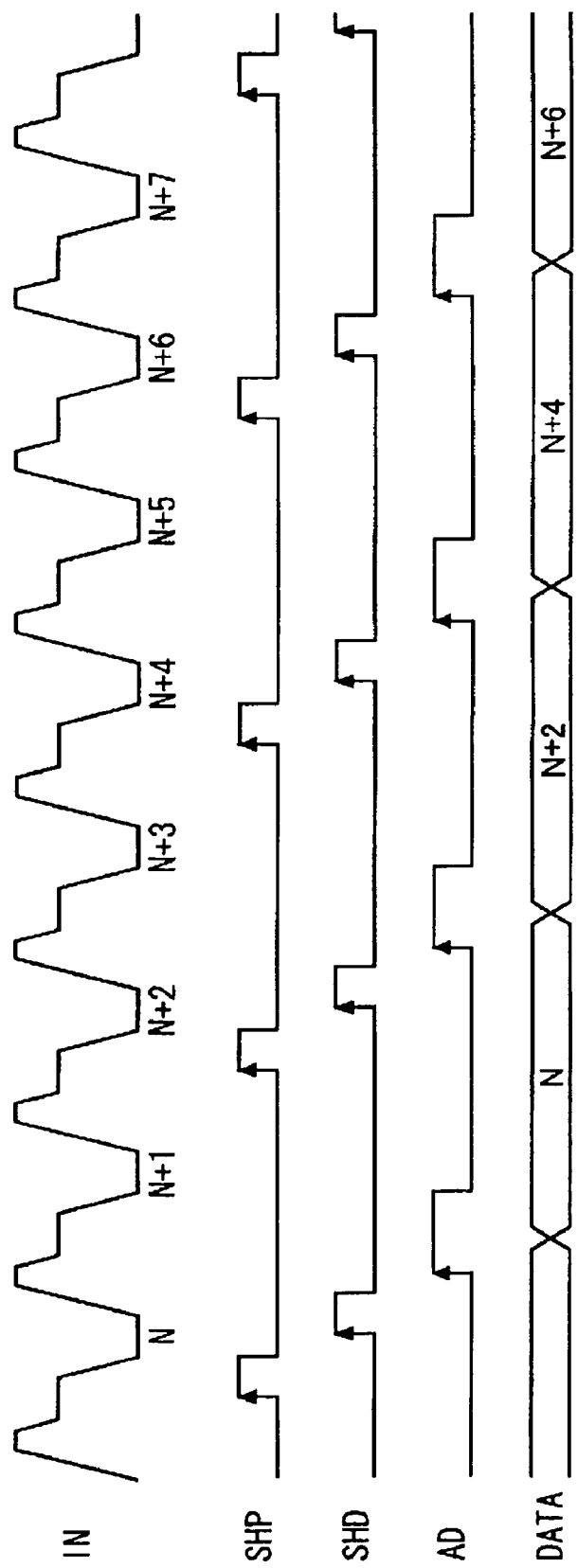
FIG. 9 is a view showing an operation of a measuring means.
Figure 10:
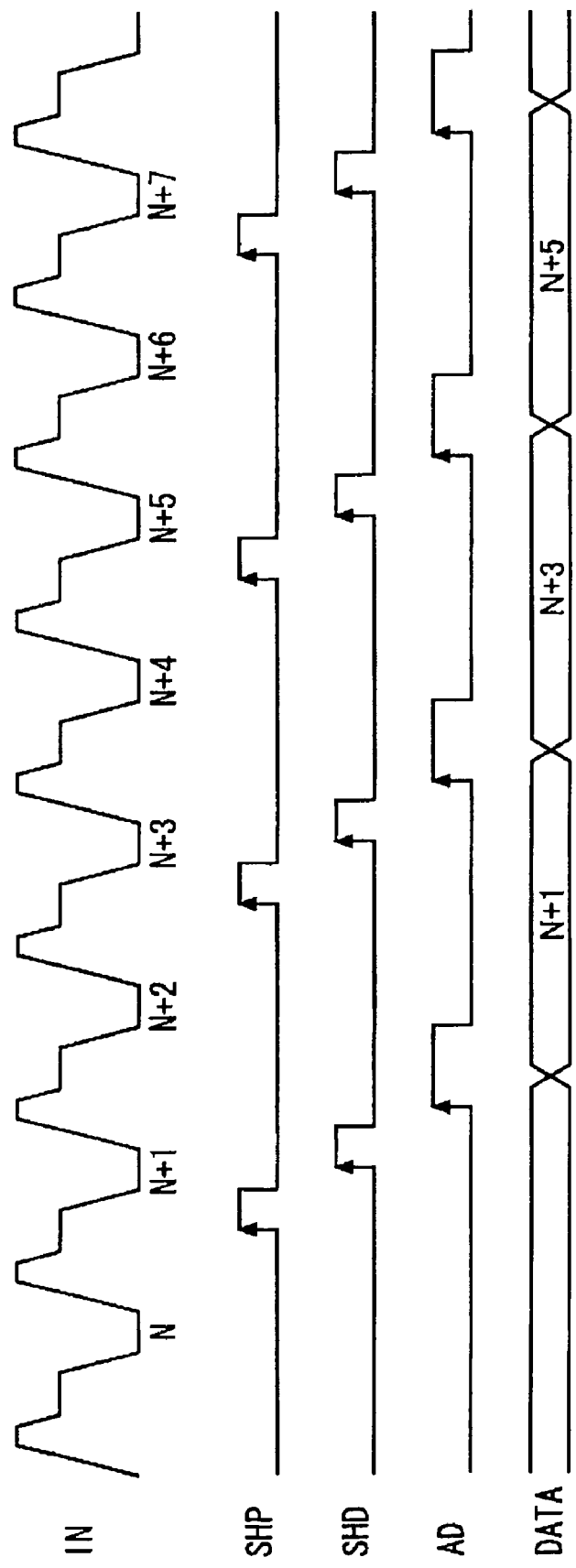
FIG. 10 is a view showing an operation of a measuring means.
Figure 11:
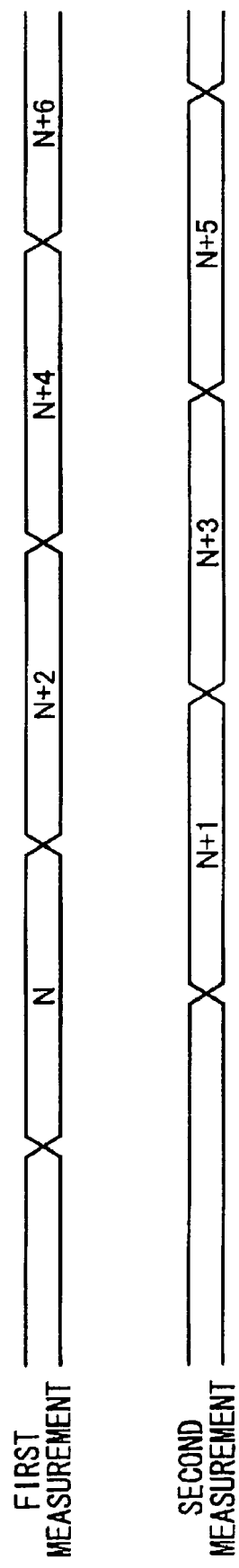
FIG. 11 is a view showing pixel data acquired by a signal processing circuit.

FIGS. 9 to 11 are views exemplary showing operations of the test apparatus 800 according to the second embodiment. FIG. 9 shows an operation of the measuring means 802 when the DUT 10 firstly outputs an output signal and FIG. 10 shows an operation of the measuring means 802 when the DUT 10 secondly outputs an output signal. Moreover, FIG. 11 shows pixel data acquired by the signal processing circuit 824.

The TG 822 makes the DUT 10 output the same output signal by multiple times and generates the clock signal showing the timing at which the measuring means 802 measures the pixel data included in the output signal from the DUT 10 to supply the clock signal to the measuring means 802, in order to make the measuring means 802 measure pixel data different from each other in the output signal from the DUT 10 when the DUT 10 firstly outputs the output signal and when the DUT 10 secondly outputs the output signal.

First, with reference to FIG. 9, it will be described about an operation of the test apparatus 800 when the DUT 10 firstly outputs the output signal (IN). The TG 822 takes the timings for sampling shown by the clock signals (SHP, SHD, AD) according to an interval of two times of the pixel data included in the output signal (IN) from the DUT 10, and supplies the clock signals (SHP, SHD, AD) to the measuring means 802. In this way, the measuring means 802 skips one pixel data to measure the pixel data included in the output signal (IN). That is to say, the measuring means 802 measures pixel data (N, N+2, N+4 . . . ).

Next, with reference to FIG. 10, it will be described about an operation of the test apparatus 800 when the DUT 10 secondly outputs the output signal (IN). The TG 822 shifts the clock signals (SHP, SHD, AD) supplied to the measuring means 802 by an interval of the pixel data included in the output signal from the DUT 10 when the DUT 10 firstly outputs the output signal (IN), and supplies the shifted signals to the measuring means 802 when the DUT 10 secondly outputs the output signal (IN). In this way, the measuring means 802 measures, in order, pixel data different from when the DUT 10 firstly outputs the output signal (IN). That is to say, the measuring means 802 measures pixel data (N+1, N+3, N+5 . . . ).

Next, with reference to FIG. 11, it will be described about an operation of the signal processing circuit 824. The signal processing circuit 824 acquires the pixel data (N, N+2, N+4 . . . ) from the measuring means 802 and stores the acquired data on the memory when the DUT 10 firstly outputs the output signal. Moreover, the signal processing circuit 824 acquires the pixel data (N+1, N+3, N+5 . . . ) from the measuring means 802 and stores the acquired data on the memory when the DUT 10 secondly outputs the output signal.

According to the test apparatus 800 of the present example, since the pixel data included in the output signal from the DUT 10 are measured two times every one while shifting the clock signal showing the timing for measuring the pixel data included in the output signal from the DUT 10, it is possible to measure all of the pixel data included in the output signal from the DUT 10 operating at high speed and to test the DUT 10 with a simple structure.

In addition, in the present example, although the TG 822 sets the timings for sampling shown by the clock signals (SHP, SHD, AD) to an interval of two times of the pixel data included in the output signal (IN) from the DUT 10 and makes the measuring means 802 measure the output signal from the DUT 10 two times, the TG may set the timings to an interval of N times of the pixel data included in the output signal (IN) from the DUT 10 and make the measuring means 802 measure the output signal from the DUT 10 N times.

Figure 12:
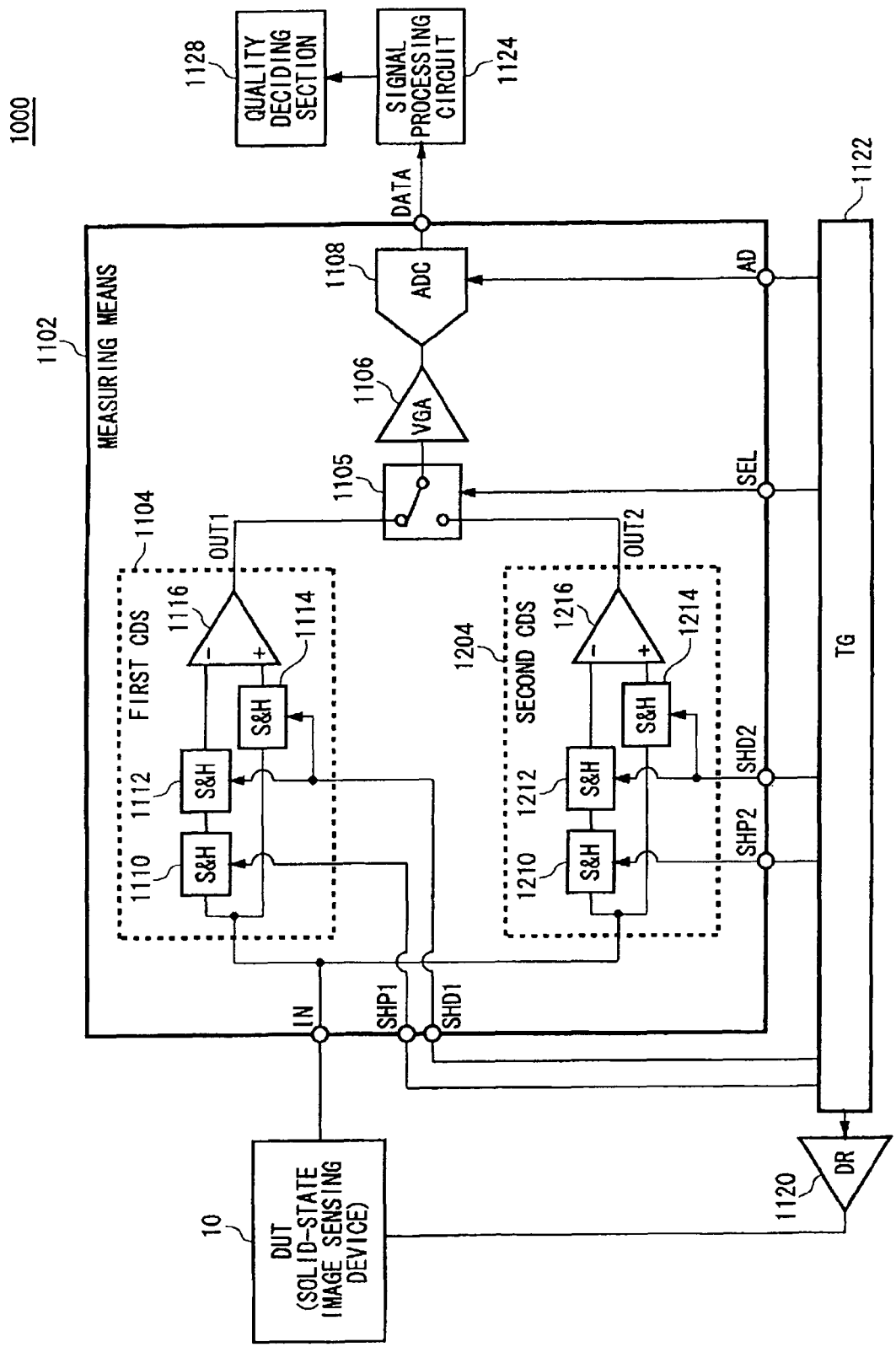
FIG. 12 is a view exemplary showing a configuration of a test apparatus.

FIG. 12 is a view exemplary showing a configuration of a test apparatus 1000 according to the third embodiment of the present invention. The test apparatus 1000 includes a measuring means 1102, a DR 1120, a TG 1122, a signal processing circuit 1124, and a quality deciding section 1128. In addition, the test apparatus 1000 is an example of a signal reading apparatus that reads an output signal from a solid-state image sensing device of the present invention.

The measuring means 1102 has a first CDS 1104, a second CDS 1204, a selector 1105, a VGA 1106, and an ADC 1108. The first CDS 1104 includes an S&H 1110, an S&H 1112, an S&H 1114, and a subtracter 1116. Moreover, the second CDS 1204 includes an S&H 1210, an S&H 1212, an S&H 1214, and a subtracter 1216.

In addition, the first CDS 1104 and the second CDS 1204 are examples of a measuring means of the present invention, and the measuring means of the present invention may have a circuit configuration other than the first CDS 1104 and the second CDS 1204. Moreover, the measuring means 1102 may have an amplifier with fixed gain in place of the VGA 1106.

The TG 1122 generates a clock signal showing a timing at which the DUT 10 outputs an output signal to supply the clock signal to the DUT 10 via the DR 1120. Then, the DUT 10 outputs an output signal including continued pixel data to supply the output signal to the measuring means 1102 based on the clock signal input from the DR 1120.

Moreover, the TG 1122 generates a clock signal showing a timing at which each of the first CDS 1104 and the second CDS 1204 measure pixel data included in the output signal from the DUT 10, and respectively supplies the clock signal to the first CDS 1104 and the second CDS 1204. Then, the first CDS 1104 and the second CDS 1204 respectively measure the pixel data included in the output signal from the DUT 10 based on the clock signal supplied from the TG 1122.

Specifically, the S&H 1110 samples a voltage value of a reset division in the output signal from the DUT 10 based on a clock signal (SHP1) input from the TG 1122. The S&H 1112 acquires the voltage value sampled by the S&H 1110 to supply the acquired value to the subtracter 1116 based on a clock signal (SHD1) input from the TG 1122. Moreover, the S&H 1114 samples a voltage value of a data division in the output signal from the DUT 10 to supply the value to the subtracter 1116 based on the clock signal (SHD1) input from the TG 1122. That is to say, the clock signals (SHP1) and (SHD1) have a phase difference for a time interval between the reset division and the data division in the output signal from the DUT 10. Moreover, the S&H 1112 and the S&H 1114 synchronously supply the voltage values to the subtracter 1116 by operating based on the same clock signal (SHD1). The subtracter 1116 computes a difference between the voltage value of the reset division supplied from the S&H 1112 and the voltage value input from the S&H 1114 to output the difference as pixel data, and supplies the difference to the selector 1105.

The S&H 1210 samples the voltage value of the reset division in the output signal from the DUT 10 based on a clock signal (SHP2) input from the TG 1122. The S&H 1212 acquires the voltage value sampled by the S&H 1210 to supply the value to the subtracter 1216 based on a clock signal (SHD2) input from the TG 1122. Moreover, the S&H 1214 samples the voltage value of the data division in the output signal from the DUT 10 to supply the value to the subtracter 1216 based on the clock signal (SHD2) input from the TG 1122. That is to say, the clock signals (SHP2) and (SHD2) have a phase difference for a time interval between the reset division and the data division in the output signal from the DUT 10. Moreover, the S&H 1212 and the S&H 1214 synchronously supply the voltage values to the subtracter 1216 by operating based on the same clock signal (SHD2). The subtracter 1216 computes a difference between the voltage value of the reset division supplied from the S&H 1212 and the voltage value input from the S&H 1214 to output the difference as pixel data, and supplies the difference to the selector 1105.

The selector 1105 sequentially selects the pixel data included in the output signal from the DUT 10, which are measured by the first CDS 1104 and the second CDS 1204, to supply the selected data to the VGA 1106, based on a clock signal (SEL) input from the TG 1122. The VGA 1106 amplifies the pixel data output from the selector 1105. The ADC 1108 converts the pixel data amplified by the VGA 1106 into a digital signal to supply the digital signal to the signal processing circuit 1124 based on a clock signal (AD) input from the TG 1122.

The quality deciding section 1128 decides the good or bad of the DUT 10 based on the pixel data that are measured by the measuring means 1102 and on which the signal processing circuit 1124 performs a desired signal processing. By the above operations, the test apparatus 1000 tests the DUT 10 based on the pixel data included in the output signal from the DUT 10.

In addition, although the measuring means 1102 includes two CDS of the first CDS 1104 and the second CDS 1204 in the present example, in another example, the test apparatus 1000 may includes three or more CDSs and measure the pixel data included in the output signal from the DUT 10 by means of three or more CDSs by an interleaving operation.

Figure 13:
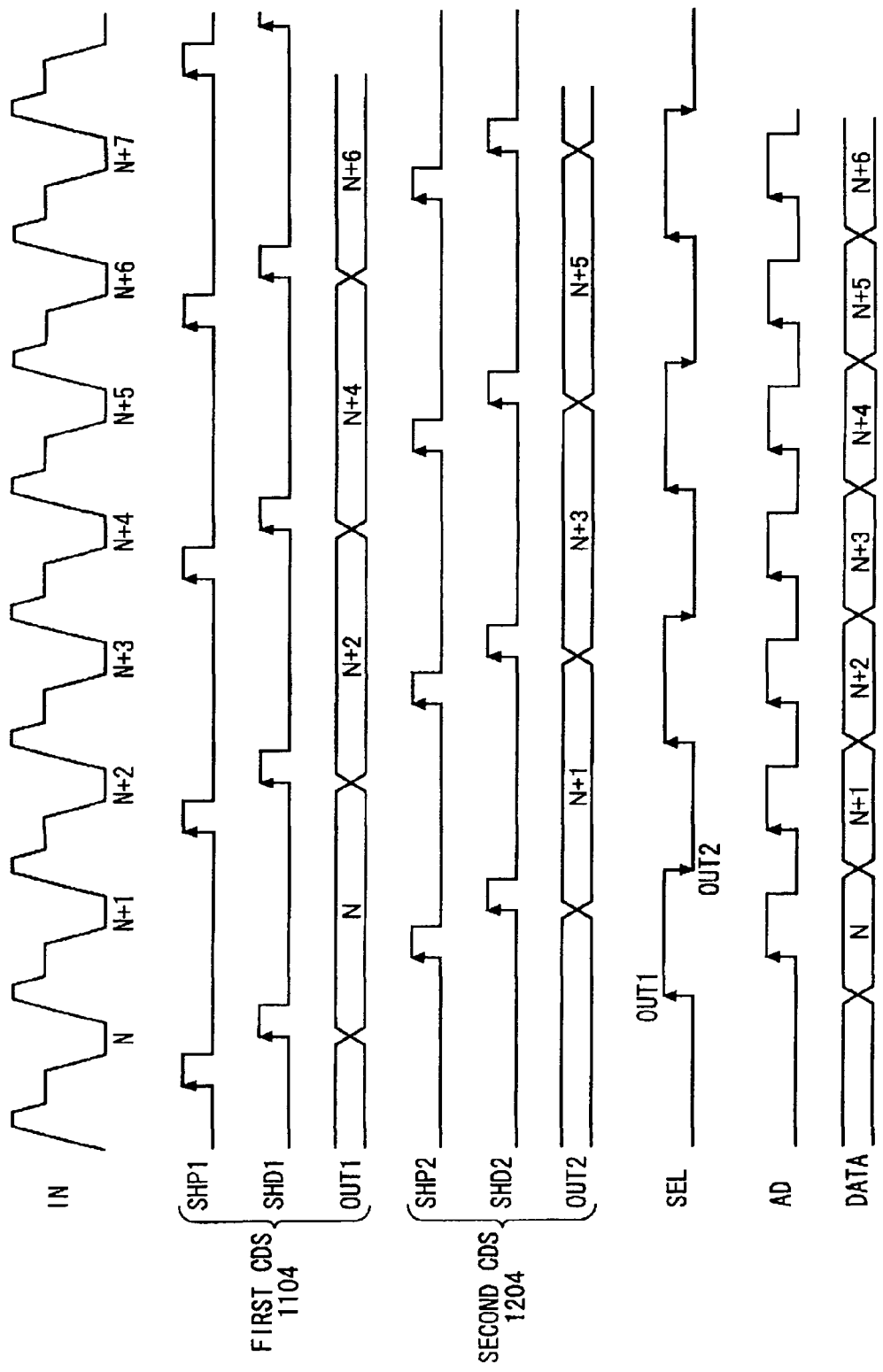
FIG. 13 is a view showing an operation of a measuring means.
Figure 14:
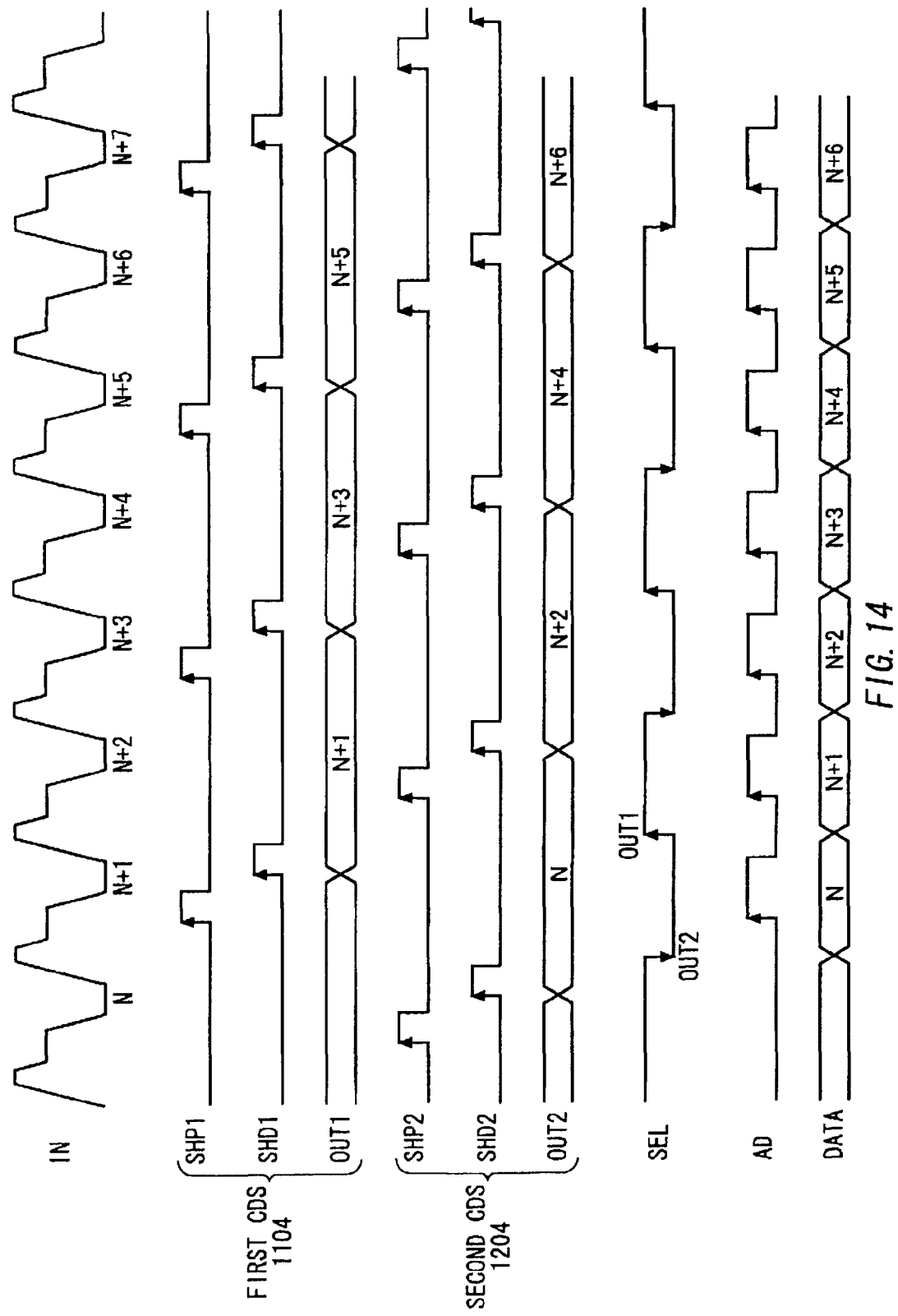
FIG. 14 is a view showing an operation of a measuring means.
Figure 15:
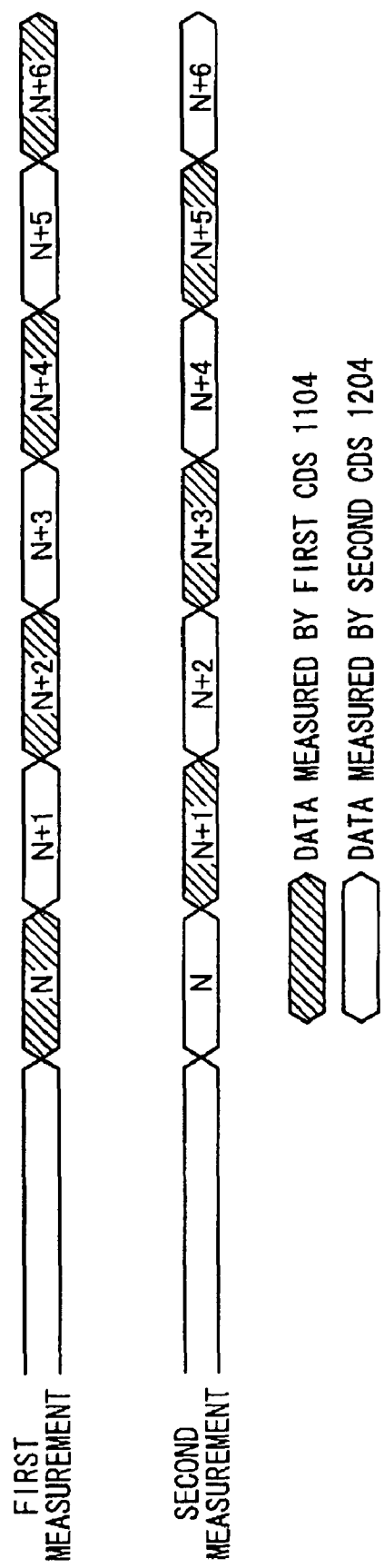
FIG. 15 is a view showing pixel data acquired by a signal processing circuit.

FIGS. 13 to 15 are views exemplary showing an operation of the test apparatus 1000 according to the third embodiment. FIG. 13 shows an operation of the measuring means 1102 when the DUT 10 firstly outputs an output signal and FIG. 14 shows an operation of the measuring means 1102 when the DUT 10 secondly outputs an output signal. Moreover, FIG. 15 shows pixel data acquired by the signal processing circuit 1124.

The TG 1122 generates a clock signal showing a timing at which each of the first CDS 1104 and the second CDS 1204 measures the pixel data included in the output signal from the DUT 10 and respectively supplies the clock signal to the first CDS 1104 and the second CDS 1204, in order to make the first CDS 1104 and the second CDS 1204 sequentially measure the pixel data included in the output signal from the DUT 10 by an interleaving operation. Moreover, the TG 1122 supplies a clock signal showing a timing at which the DUT 10 outputs the output signal via the DR 1120 by multiple times, in order to make the DUT 10 output the same output signal by multiple times. Then, the TG 1122 generates the clock signal showing the timing at which each of the first CDS 1104 and the second CDS 1204 measures the pixel data included in the output signal from the DUT 10, in order to make the CDS different from each other measure the pixel data at the same timing within the output signal from the DUT 10 when the DUT 10 firstly outputs the output signal and when the DUT 10 secondly outputs the output signal.

First, with reference to FIG. 13, it will be explained about an operation of the test apparatus 1000 when the DUT 10 firstly outputs the output signal (IN). The TG 1122 sets a phase difference between the clock signals (SHP1, SHD1) and the clock signals (SHP2, SHD2) to a length of the pixel data included in the output signal (IN) from the DUT 10, and supplies the clock signals (SHP1, SHD1) and the clock signals (SHP2, SHD2) to each of the first CDS 1104 and the second CDS 1204. In this way, the first CDS 1104 and the second CDS 1204 measure the pixel data included in the output signal (IN) in order every pixel data. That is to say, the first CDS 1104 measures the pixel data (N), the second CDS 1204 measures the pixel data (N+1), the first CDS 1104 measures the pixel data (N+2), and the second CDS 1204 measures the pixel data (N+3).

Moreover, the TG 1122 supplies a clock signal (SEL) corresponding to the timing, at which the first CDS 1104 and the second CDS 1204 respectively measure the pixel data, to the selector 1105. Then, the selector 1105 sequentially selects and acquires the pixel data respectively measured by the first CDS 1104 and the second CDS 1204 based on the clock signal (SEL).

Moreover, the TG 1122 supplies a clock signal (AD) showing the timing, at which the ADC 1108 converts the pixel data acquired by the selector 1105 into digital data, to the ADC 1108. Then, the ADC 1108 converts the pixel data, which are selected by the selector 1105 and are amplified by the VGA 1106, into digital data, and supplies the converted data to the signal processing circuit 1124, based on the clock signal (AD).

Next, with reference to FIG. 14, it will be described about an operation of the test apparatus 1000 when the DUT 10 secondly outputs the output signal (IN). The TG 1122 supplies the clock signals (SHP1, SHD1) to the first CDS 1104 when the DUT 10 secondly outputs the output signal (IN), at the same timing as the timing at which the TG has supplied the clock signals (SHP2, SHD2) to the second CDS 1204 when the DUT 10 firstly outputs the output signal (IN). Moreover, the TG 1122 supplies the clock signals (SHP2, SHD2) to the second CDS 1204 when the DUT 10 secondly outputs the output signal (IN), at the same timing as the timing at which the TG has supplied the clock signals (SHP1, SHD1) to the first CDS 1104 when the DUT 10 firstly outputs the output signal (IN)

In this way, the first CDS 1104 and the second CDS 1204 sequentially measure pixel data different from when the DUT 10 firstly outputs the output signal (IN). That is to say, the second CDS 1204 measures the pixel data (N), the first CDS 1104 measures the pixel data (N+1), the second CDS 1204 measures the pixel data (N+2), and the first CDS 1104 measures the pixel data (N+3).

Moreover, the TG 1122 supplies the clock signal (SEL) to the selector 1105 when the DUT 10 secondly outputs the output signal (IN), at the same timing as the timing at which the TG has supplied the clock signal (SEL) to the selector 1105 when the DUT 10 firstly outputs the output signal (IN). Moreover, the TG 122 supplies the clock signal (AD) to the ADC 1108 when the DUT 10 secondly outputs the output signal (IN), at the same timing as the timing at which the TG has supplied the clock signal (AD) to the ADC 1108 when the DUT 10 firstly outputs the output signal (IN).

Then, the selector 1105 sequentially selects and acquires the pixel data respectively measured by the first CDS 1104 and the second CDS 1204 based on the clock signal (SEL) when the DUT 10 secondly outputs the output signal (IN), similarly to when the DUT 10 firstly outputs the output signal (IN). Then, the ADC 1108 converts the pixel data, which are selected by the selector 1105 and are amplified by the VGA 1106, into digital data to supply the converted data to the signal processing circuit 1124 based on the clock signal (AD) when the DUT 10 secondly outputs the output signal (IN), similarly to when the DUT 10 firstly outputs the output signal (IN).

Next, with reference to FIG. 15, it will be described about an operation of the signal processing circuit 1124. The signal processing circuit 1124 acquires the pixel data, which are respectively measured by the first CDS 1104 and the second CDS 1204 and are selected by the selector 1105, from the ADC 1108. That is to say, the signal processing circuit 1124 acquires the pixel data (N) measured by the first CDS 1104, acquires the pixel data (N+1) measured by the second CDS 1204, acquires the pixel data (N+2) measured by the first CDS 1104, and acquires the pixel data (N+3) measured by the second CDS 1204, when the DUT 10 firstly outputs the output signal. Moreover, the signal processing circuit 1124 acquires the pixel data (N) measured by the second CDS 1204, acquires the pixel data (N+1) measured by the first CDS 1104, acquires the pixel data (N+2) measured by the second CDS 1204, and acquires the pixel data (N+3) measured by the first CDS 1104, when the DUT 10 secondly outputs the output signal.

Then, the signal processing circuit 1124 acquires data by averaging the pixel data measured by the first CDS 1104 and the second CDS 1204 when the DUT 10 has firstly output the output signal and the pixel data measured by the first CDS 1104 and the second CDS 1204 when the DUT 10 has secondly output the output signal, in order to store the acquired data on the memory.

According to the test apparatus 1000 of the present example, since the plurality of CDSs is provided and the CDSs measure the pixel data included in the output signal from the DUT 10 by means of an interleaving operation, it is possible to test the DUT 10 operating at high speed. Moreover, although there is a measurement error due to a mismatch between the first CDS 1104 and the second CDS 1204, it is possible to prevent the generation of striped pattern due to a mismatch between the first CDS 1104 and the second CDS 1204 when replaying an image based on the pixel data.

Specifically, assuming that a level of the pixel data included in the output signal From the DUT 10 is x, a measured value by the first CDS 1104 is $y_1 = ax + b$, and a measured value by the second CDS 1204 is $y_2 = cx + d$, the pixel data averaged and acquired by the signal processing circuit 1 124 becomes $Y = (a+c)x/2 + b + d)/2$. That is to say, since $(a+c)/2$ and $(b+d)/2$ are a constant constants determined by characteristics of the first CDS 1104 and the second CDS 1204, the pixel data acquired by the signal processing circuit 1124 are seen similarly to the pixel data measured by one measuring means. Therefore, it is possible to prevent the generation of measurement error by a mismatch between the first CDS 1104 and the second CDS 1204.

Moreover, according to the test apparatus 1000 of the present example, since the pixel data measured by the first CDS 1104 and the pixel data measured by the second CDS 1204 are averaged, it is possible to reduce random noises generated by the DUT 10 or the test apparatus 1000.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

As apparent from the above descriptions, according to an exemplary embodiment of the present invention, it is possible to read a signal from a solid-state image sensing device at extremely high speed.

What is claimed is:

1. A signal reading apparatus that reads an output signal, which includes a plurality of pixel data sequentially arranged, from a solid-state image sensing device, comprising:

a plurality of measuring means including a first measuring means and a second measuring means that measure, at respective timings, pixel data included in the output signal from the solid-state image sensing device;

a timing generator that generates a clock signal showing a timing at which each of the plurality of measuring means measures the pixel data from the solid-state image sensing device and respectively supplies the clock signal to the plurality of measuring means in order to make the plurality of measuring means sequentially measure the pixel data from the solid-state image sensing device by means of an interleaving operation; and a signal processing circuit that sequentially selects and acquires the pixel data from the solid-stat image sensing device measured by the plurality of measuring means, wherein the timing generator generates a clock signal showing a timing corresponding to the timing at which each of the plurality of measuring means measures the pixel data from the solid-state image sensing device and supplies the clock signal to the signal processing circuit, and the timing generator makes the solid-state image sensing device output the same output signal, including the same plurality of pixel data, multiple times and generates a clock signal to be respectively supplied to the plurality of measuring means in order to make the first measuring means measure a first set of the plurality of pixel data when the solid-state image sensing device firstly outputs the output signal and to make the second measuring means measure the first set of the plurality of pixel data when the solid-state sensing device secondly outputs the output signal.

2. The signal reading apparatus as claimed in claim 1, wherein
the signal processing circuit acquires data obtained by averaging the plurality of pixel data measured by the plurality of measuring means when the solid-state image sensing device has firstly output the output signal and the plurality of pixel data measured by the plurality of measuring means when the solid-state image sensing device has secondly output the output signal.

3. The signal reading apparatus as claimed in claim 1, wherein
the timing generator generates the clock signal in order to make the second measuring means measure a second set of the plurality of pixel data when the solid-state image sensing device firstly outputs the output signal.

4. The signal reading apparatus as claimed in claim 3, wherein
the timing generator generates the clock signal in order to make the first measuring means measure the second set of the plurality of pixel data when the solid-state image sensing device secondly outputs the output signal.

5. A test apparatus that tests a solid-state image sensing device, comprising:
a plurality of measuring means including a first measuring means and a second measuring means that measure, at respective timings pixel data included in an output signal, which includes a plurality of pixel data sequentially arranged, from the solid-state image sensing device;
a timing generator that generates a clock signal showing a timing at which each of the plurality of measuring means measures the pixel data from the solid-state image sensing device and respectively supplies the clock signal to the plurality of measuring means in order to make the plurality of measuring means sequentially measure the pixel data from the solid-state image sensing device by means of an interleaving operation;
a quality deciding section that decides the good or bad of the solid-state image sensing device based on the pixel data measured by the plurality of measuring means; and
a signal processing circuit that sequentially selects and acquires the pixel data from the solid-stat image sensing device measured by the plurality of measuring means,
wherein the timing generator generates a clock signal showing a timing corresponding to the timing at which each of the plurality of measuring means measures the pixel data from the solid-state image sensing device and supplies the clock signal to the signal processing circuit, and
the timing generator makes the solid-state image sensing device output the same output signal, including the same plurality of pixel data, multiple times and generates a clock signal to be respectively supplied to the plurality of measuring means in order to make the first measuring means measure a first set of the plurality of pixel data when the solid-state image sensing device firstly outputs the output signal and to make the second measuring means measure the first set of the plurality of pixel data when the solid-state sensing device secondly outputs the output signal.

6. The test apparatus as claimed in claim 5, wherein
the signal processing circuit acquires data obtained by averaging the plurality of pixel data measured by the plurality of measuring means when the solid-state image sensing device has firstly output the output signal and the plurality of pixel data measured by the plurality of measuring means when the solid-state image sensing device has secondly output the output signal.

7. The test apparatus as claimed in claim 5, wherein
the timing generator generates the clock signal in order to make the second measuring means measure a second set of the plurality of pixel data when the solid-state image sensing device firstly outputs the output signal.

8. The signal reading apparatus as claimed in claim 7, wherein
the timing generator generates the clock signal in order to make the first measuring means measure the second set of the plurality of pixel data when the solid-state image sensing device secondly outputs the output signal.

9. A signal reading apparatus that reads an output signal, which includes a plurality of pixel data sequentially arranged, from a solid-state image sensing device, comprising:
a measuring means that measures pixel data included in the output signal from the solid-state image sensing device; and
a timing generator that makes the solid-state image sensing device output the same output signal, including the same plurality of pixel data, multiple times and generates a clock signal showing a timing at which the measuring means measures the pixel data from the solid-state image sensing device to supply the clock signal to the measuring means, in order to make the measuring means sequentially measure a first set of the plurality of pixel data at predetermined intervals when the solid-state image sensing device firstly outputs the output signal and to make the measuring means sequentially measure a second set of the plurality of pixel data at the predetermined intervals when the solid-state image sensing device secondly outputs the output signal.

10. A test apparatus that tests a solid-state image sensing device, comprising:
a measuring means that measures pixel data included in an output signal, which includes a plurality of pixel data sequentially arranged, from the solid-state image sensing device;
a timing generator that makes the solid-state image sensing device output the same output signal, including the same plurality of pixel data, multiple times and generates a clock signal showing a timing at which the measuring means measures the pixel data from the solid-state image sensing device to supply the clock signal to the measuring means, in order to make the measuring means sequentially measure a first set of the plurality of pixel data at predetermined intervals when the solid-state image sensing device firstly outputs the output signal and to make the measuring means sequentially measure a second set of the plurality of pixel data at the predetermined intervals when the solid-state image sensing device secondly outputs the output signal; and
a quality deciding section that decides the good or bad of the solid-state image sensing device based on the pixel data acquired by the measuring means.

* * * * *